Oct. 1, 1946.                E. NASSOUR                 2,408,528
                        RACE RECORDING SYSTEM
                        Filed Jan. 16, 1945
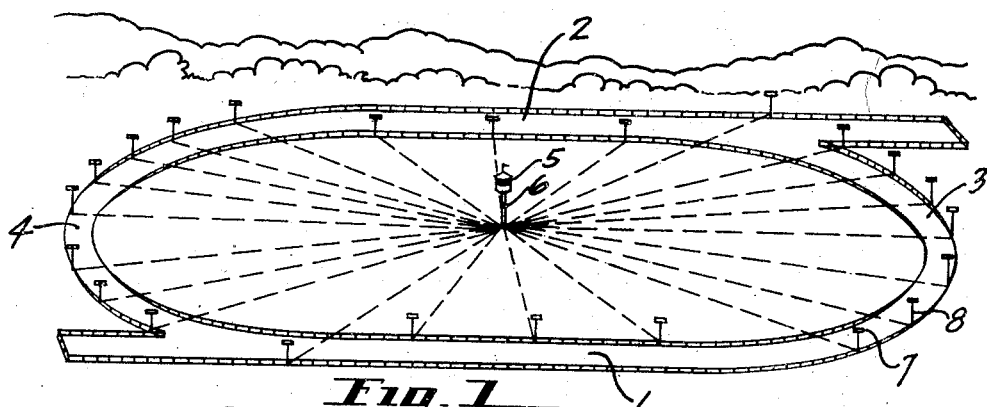
Fig. 1
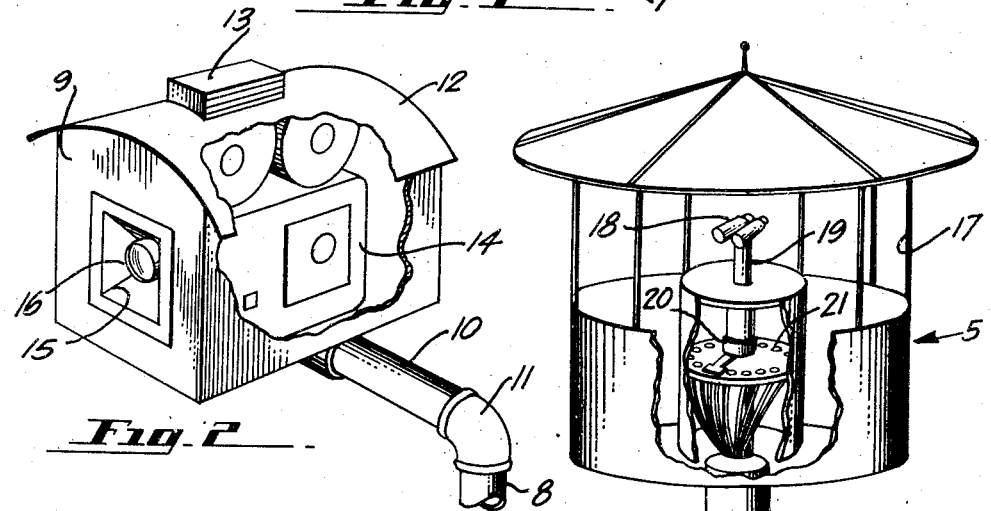
Fig. 2
Fig. 3
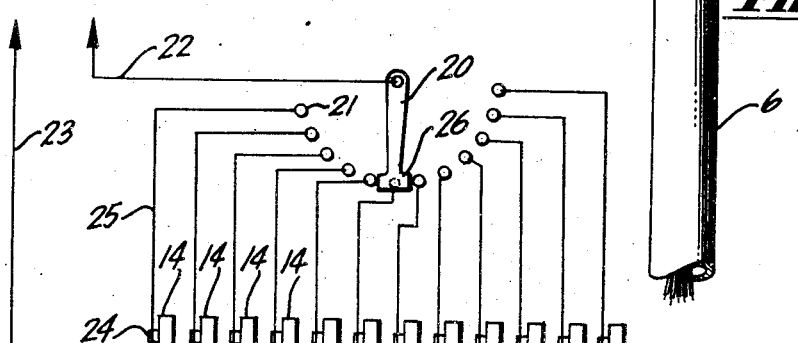
Fig. 4
EDWARD NASSOUR
    INVENTOR.
BY
   ATTORNEY Patented Oct. 1, 1946

2,408,528

UNITED STATES PATENT OFFICE 2,408,528

RACE RECORDING SYSTEM

Edward Nassour, Los Angeles, Calif.

Application January 16, 1945, Serial No. 572,989

4 Claims. (Cl. 88—16)

My invention relates to an apparatus for recording the races, particularly horse races, and has particular reference to a system for making motion pictures of all portions of a race.

In refereeing or judging races, such as horse races, it is essential that the commission of a foul or any conduct not permitted by the rules be detected so that the offending horse or rider may be disqualified. Fouls and improper conduct are very difficult to detect and are even more difficult to establish by incontrovertible proof. The judging of races is ordinarily done from a judges' stand or observers' location either positioned at one side of the oval track or in an elevated tower positioned centrally of the track. From either location the judges' or observers' viewpoint is not calculated to best observe the relative actions of all of the horses and riders, particularly cases of crowding or interference are very difficult to detect when viewed from the side. These conditions are best observed when viewed from a position directly in front of the approaching horses. Since a position directly in front of the approaching horses must progress around the track as the horses progress around the oval, it is obviously impossible for visual observation to be maintained from the desired viewpoint. Also, occurrences of this nature happen so very quickly that the fallible powers of perception and memory make visual observation and memory of the occurrences very unreliable. This condition may be alleviated somewhat by the use of a motion picture camera which is so turned as to follow the horses in their progress around the track. This expedient does not, however, cure the difficulties occasioned by the disadvantageous viewpoint which must be taken by the observers and by the camera.

It is, therefore, an object of the present invention to provide a means for overcoming the above noted disadvantages attendant upon the judging of a race by taking a series of motion pictures of the race from successive viewpoints distributed around the racetrack and looking generally lengthwise of the track and controlling the operation of the cameras in sequence from a centrally located observing station.

It is also an object of my invention to provide a series of motion picture cameras distributed around the racetrack and looking generally lengthwise thereof, each of said cameras having a remotely operated drive mechanism, together with a sighting device so positioned relative to the track as to permit the sighting device to be trained on the race and to follow the progress of the race completely along the track, the sighting device being journaled for following the race and coupled to a control mechanism for starting and stopping the cameras in a sequence which is controlled by the progress of the race.

It is an additional object of my invention to provide a race recording system which consists in successively taking motion pictures of the race from a series of stations spaced around the racetrack and controlling the taking of said pictures in accordance with the progress of the race.

Other objects and advantages of my invention will become apparent from a study of the following specifications, read in connection with the accompanying drawing, wherein:

Fig. 1 is a perspective view illustrating the general arrangement of the apparatus employed in the preferred embodiment of my invention;

Fig. 2 is a perspective view illustrating the details characteristic of each of the motion picture camera stations;

Fig. 3 is a perspective view with parts broken away to show the details of the mechanism used at the central observing or sighting station; and Fig. 4 is a schematic diagram showing the electrical circuits used in the preferred embodiment of my invention.

Referring to the drawing, I have illustrated in Fig. 1 a racetrack of more or less conventional construction which is of a generally oval shape including a straight or home stretch portion 1 and a like straight or back stretch portion 2, the straight portions being connected by curved ends 3 and 4. An observing station 5 is preferably placed at or near the geometric center of the racetrack and is preferably elevated as a tower upon a support 6 to permit an observer to have a clear and uninterrupted view of all portions of the track.

According to my invention there are distributed around the track a series of motion picture camera stations 7. These stations are located on the outside rail at the curved ends 3 and 4 and along the inside rail at the stretches 1 and 2.

The camera stations may comprise posts or uprights 8, from the top of which is bracketed a camera housing 9. The posts 8 may conveniently comprise sections of steel pipe and the bracketing may be done by a horizontally disposed section 10 of a like pipe joined to the upright 8 as by means of an L 11. The bracket or horizontal extension 10 is used to dispose the camera housing 9 within the rail and over the track itself, an extension of two or three feet ordinarily being sufficient.

The camera housings 9 each comprise a weatherproof box or enclosure which may be fitted with a roof 12 carrying a ventilator 13 to provide for air cooling of an electric motor driven motion picture camera 14 which is disposed within the housing 9. One end of the housing 9 is apertured as shown at 15 to receive the objective lens 16 of the camera.

Each of the camera stations 7 is so positioned that the camera looks generally lengthwise of the track and in a direction counter to the normal direction in which the races are run. The spacing of the camera stations is so selected that the fields of vision of the camera are overlapping so that before the horses pass beyond the field of one of the cameras, they come into the field of the next camera around the track.

In the interests of conserving film, I propose to operate each of the cameras for only a fraction of the time required to run the race, the cameras being started and stopped in an overlapping succession, which succession progresses around the racetrack in the direction and at the same rate as the horses circle the track. This mode of operation is accomplished by means of a control mechanism which is located at the observing station 5 and which is illustrated in detail in Fig. 3.

The observing station 5 preferably comprises a house or belfry having windows or other clear vision openings 17 extending completely around the periphery of the house. Within the center of the house there is mounted a sighting means 18 which may comprise field glasses or a binocular telescope. The sighting means 18 is mounted upon a vertically extending shaft 19 which is journaled for rotation so that the sighting means 18 may be moved through a prescribed path by an observer stationed within the house 5 to follow the horses as they race around the track.

The shaft 19 carries a movable electric contact arm 20 which moves with the sighting means 18 and in so doing passes successively over a series of circumferentially spaced stationary electrical contacts 21. Each of the successive stationary contacts 21 is connected respectively, to one of the successive cameras 14 in the series to supply current to the driving mechanisms of the cameras in succession as the movable switch arm passes successively over the stationary contacts as the observer uses the sighting device to follow the progress of the race. A simple circuit which may be used is illustrated in Fig. 4 wherein a conductor 22 connected to one polarity of a suitable source of electric power is shown as being connected to the movable switch arm 20.

Another conductor 23 connected to the opposite polarity of the source of power is connected in parallel to all of the electric motors which are used to drive the various motion picture cameras 14, these motors being represented in Fig. 4 by the small rectangles bearing the reference character 24. The opposite terminal of each of the motors 24 is connected by a conductor 25 to a corresponding one of the stationary electric contacts 21. Thus it will be seen that when the movable switch arm 20 is resting upon the first stationary contact 21, the first camera in the series around the track will be in operation and as the sighting means is moved to follow the race, the switch arm 20 will sweep successively over the remaining contacts and the corresponding motion picture cameras will be started successively. They will be stopped as soon as the contact arm leaves the corresponding stationary contact.

As previously stated, the operation of the motion picture cameras is made overlapping as are their respective fields of view so that the cameras are each started before the horses come into the field of view and are maintained in operation until a short time after the horses leave the field of view. The respective starting time of the individual cameras is controlled by controlling the circumferential spacing of the stationary contacts 21 while the duration of the operation of each camera is controlled by adjusting the peripheral width of the contacting end of the movable contact arm 20. For this reason the moving end of the arm 20 is given a substantial circumferential width as by means of a transversely extending portion 26.

From the foregoing it will be seen that in the normal operation of the system of my invention an observer stationed at the observing station 5 controls the operation of the series of motion picture cameras which are located at the individual camera stations 7 by the simple procedure of keeping the field of vision of the sighting device 18 trained upon the horses as they circle the track.

It will be seen that with the arrangement described, motion pictures are taken of the horses and that these pictures are taken from viewpoints such that in the photographs obtained, the horses appear to be coming head-on toward an observer. Since this is the best possible position for the detection of fouls and irregular conduct, it provides the greatest possible probability of detecting such fouls. Furthermore, the occurrence is permanently recorded so that the matter does not have to depend upon the fallible perception and memory of a judge.

By controlling the contact arrangement in the manner described, each of the motion picture cameras is placed in operation at a sufficiently early time to insure the recording of all pertinent matters within the scope of its field and it is maintained in operation a sufficient length of time to permanently record all matters transpiring up to and beyond the time the occurrences are recorded by the next camera around the track.

Also, a considerable saving in film is effected since each of the cameras is operated for only a small fraction of the total time required to run the race.

While I have shown and described the preferred embodiment of my invention, I do not desire to be limited to any of the details of construction shown or described herein, except as defined in the appended claims.

I claim:

1. In an apparatus for recording a race around a closed track, the combination of: a series of motion picture cameras arranged in spaced relation to each other around said track, each of said cameras being positioned with its optical axis extending lengthwise of the track segment to which it is adjacent to dispose such track segment in the field of view of the camera, control means for each of the cameras to control the starting and stopping of photographing the respective track segments by respective cameras, a sighting device, means mounting said sighting device for movement by an observer to maintain the field of vision of said sighting device upon a race as the race progresses about said track, and means actuated by movement of said sighting device for actuating the control means for each camera successively as a race progresses into the field of view of the respective camera adjacent the segment then within the field of vision of said sighting device.

2. In an apparatus for recording a race around a closed track, the combination of: a series of motion picture cameras arranged in spaced relation to each other around said track, each of said cameras being positioned with its optical axis extending lengthwise of the track segment to which it is adjacent to dispose such track segment in the field of view of the camera, control means for each of the cameras to control the starting and stopping of photographing the respective track segments by the respective cameras, a sighting device, means mounting said sighting device for movement by an observer to maintain the field of vision of said sighting device upon the race as said race progresses about said track, and means actuated by movement of said sighting device for successively actuating the control means for each camera to start the camera as the race progresses into the field of view of the camera adjacent the segment then within the field of vision of said sighting device and for stopping each camera after the next succeeding camera in the series is started.

3. In an apparatus for recording a race along a race track, the combination of: a series of spaced motion picture cameras arranged adjacent said track, each of said cameras being positioned with its optical axis extending lengthwise of that track section to which it is adjacent; drive means for each of said cameras; a sighting device; means movably mounting said sighting device at an observing station positioned relative to said track to permit said sighting device to be trained on the race and to follow the progress of the race along said track; and a control mechanism connected to all of said camera drive means and actuated by movement of said sighting device for sequentially operating the drive means of successive cameras as said sighting device is moved to bring within its field of vision the track section adjacent to which each of said cameras is respectively located.

4. In an apparatus for recording a race along a race track, the combination of: a series of spaced motion picture cameras arranged adjacent said track, each of said cameras being positioned with its optical axis extending lengthwise of that track section to which it is adjacent; electrical drive means for each of said cameras; a sighting device; means movably mounting said sighting device at an observing station positioned relative to said track to permit said sighting device to be trained on the track and to follow the progress of the race along said track; a switch including a switch arm movable sequentially along a plurality of stationary contacts; means coupling said switch arms to said sighting device for movement over said stationary contacts sequentially as the sighting device is moved by an observer in maintaining the field of vision of the sighting device directed toward the race as said race progresses along said track; electrical circuit means connecting each of said stationary contacts, respectively, to that one of the cameras corresponding to the position of said switch arm when the field of vision of the sighting device is directed to the track segment adjacent to said camera; and circuit means connecting said movable switch arm and said camera drive means to a source of electric power.

EDWARD NASSOUR.